Patented Dec. 8, 1925.

1,564,385

UNITED STATES PATENT OFFICE.

SELMAN A. WAKSMAN, OF NEW BRUNSWICK, NEW JERSEY, ASSIGNOR TO JACQUES WOLF & CO., OF PASSAIC, NEW JERSEY, A CORPORATION OF NEW JERSEY.

CONCENTRATED ENZYMIC SUBSTANCE AND METHOD OF PREPARING SAME.

No Drawing. Application filed August 11, 1922, Serial No. 581,236. Renewed February 28, 1925.

*To all whom it may concern:*

Be it known that I, SELMAN A. WAKSMAN, a citizen of the United States of America, residing at New Brunswick, in the county of Middlesex and State of New Jersey, have invented certain new and useful Improvements in Concentrated Enzymic Substances and Methods of Preparing Same, of which the following is a full, clear, and exact description.

This invention relates to enzymic substances and processes for producing the same and has for one of its principal objects to provide a stable enzymic substance which is more concentrated than those heretofore produced, and a method of producing the same.

Enzymes are unorganized ferments, or chemical substances of vegetable or animal origin that cause certain chemical transformations by their presence. Enzymes are produced by living cells, either animal or vegetable, including various bacteria and molds, for example, by the propagation of mold fungi such as *Aspergillus oryzæ* or other fungi of the genera Aspergillus, Penicillium and Mucor upon various substances of plant or animal origin, including bran of various grains. When brought into relation with certain organic compounds, the action of the enzymes tends to decompose such compounds into simpler combinations without themselves undergoing theoretically any change, although practically the enzymes gradually disappear in the course of the reaction. Their precise mode of action is not definitely understood but it is apparently catalytic. Enzymes act only in the presence of water and a small quantity serves to break up or change a large mass of the substance or substances on which it acts. Enzymes have well known properties such as diastatic and proteolytic. By virtue of their diastatic property, they may be employed to convert starch into sugar, this property being predominantly present in saliva which is an enzymic solution. By virtue of their proteolytic property enzymes exert a digestive action upon meat and other proteins, this property being predominantly present in the enzymic digestive juices in the stomach and pancreas of human beings and animals.

The present invention has to do with enzymes of vegetable origin having various properties including diastatic and proteolytic properties. The novel process may be generally described as follows. A suitable mass of fungus-impregnated culture medium is prepared and lixiviated with a suitable liquid such as water to extract the enzymic properties from such mass. A different or separate mass of fungus-impregnated culture medium is then soaked or steeped in the liquid extract. The liquid is then evaporated, i. e., the mixture is dried, leaving the desired enzymic substance.

Preparation of the fungus-impregnated culture medium may be effected in various ways. For example, it may be prepared in the manner disclosed in the now expired United States Patents Nos. 525,820 or 525,823 in which the fungus-impregnated mass is given the name of taka-koji.

Another, and in many respects preferable method of producing the fungus-impregnated mass is substantially as follows. Wheat bran, or other equivalent material; apple pomace, or another ventilating agent; and water are mixed, preferably in the following proportions: apple pomace—120 to 200 pounds; bran—enough to weigh with the pomace—about 1000 pounds; water—about 50 gallons. The mixture so formed is then sterilized by steaming for about one hour and then cooled down to a temperature of about 30° C., about one hour being consumed in the cooling operation. To this mixture so prepared is added about 35 gallons of water containing the seed spores. These seed spores are preferably those formed by mold fungi belonging to the genera Aspergillus, Penicillium or Mucor, such as the species *Aspergillus oryzæ* (or *Eurotium oryzæ*) or Aspergillus flavus which are readily procurable. The mass or mixture of bran, pomace, water and spores is then placed in trays and maintained at a temperature of 30° C. for about 40 to 48 hours, at which time the growth is arrested and if desirable the prepared mass is dried. For convenience I shall refer to this so-prepared dried or undried mass of fungus-impregnated material as protozyme.

*Preparation of the liquid extract.*

A dried, or undried, mass of fungus-impregnated culture medium is lixiviated with water. This may be done by permitting water or other suitable liquid to percolate through the mass, or by steeping the mass in the liquid. If desired, the strength of this solution may be increased by repeatedly treating a fresh quantity of the mass therewith. The extract may then be filtered or strained giving the desired liquid extract.

Another, and preferred, method of preparing the liquid extract is to place undried or preferably dried mass of the fungus-impregnated medium (for example—protozyme as described above) in a percolator, into which liquid is poured, allowing it to stand for about one or two hours. The liquid may then be drained off through a thick cloth strainer and this liquid, either strained or unstrained, constitutes the desired extract. Water is added to the same batch of culture medium and drained off to be employed as the liquid for lixiviating a succeeding batch of fresh culture medium.

The next step is to soak or steep a fresh mass of culture medium, prepared as above described, in the liquid extract, prepared as above described. The mixture is allowed to soak or steep for one or two hours and then dried, i. e., the liquid is evaporated off, until the moisture content is reduced to 5 per cent or less. The resultant novel substance is conveniently referred to as Protozyme concentrated. Further concentration of the desired product may be secured by steeping or soaking the Protozyme concentrated, produced as described above, in a fresh quantity of liquid extract, again drying it, and if desirable again repeating this process as many times as desired.

Summarizing a preferred method of carrying out the process: two or more lots of Protozyme are prepared, each in the manner above described. One lot is allowed to dry. The other lot or lots are lixiviated to form a liquid extract, as above described. The lot of dry Protozyme is then soaked in the liquid extract and is then dried. The last mentioned dry product may then be steeped or soaked in a fresh batch of liquid extract, again dried, and this process repeated as often as desired, depending upon the degree of concentration desired. The drying may be effected by an air current in a partial vacuum, or by exposure to the sun on a dry day, or by simply spreading the mixture out in a dry place. In any case, the drying is continued until the moisture content is reduced to 5 per cent or less. The resultant dry product is Protozyme concentrated.

This resultant product not only possesses the stability of dry Protozyme or dry taka-koji but in its enzymic properties (diastatic and proteolytic and others) it is more than twice as concentrated as either of its constituents—Protozyme and liquid extract of Protozyme.

It has been proposed by various workers in the enzymic art (see pages 769 and 770 of "Allegemeine Mikrobiologie", Kruse 1910, published at Leipzig, Germany) to preserve enzymic solutions by employing antiseptics of various kinds. In my process I employ no antiseptic whatsoever, yet the resultant product does not deteriorate because it is in dry form.

The novel product resulting from the above described novel process may be described as a dry enzymic substance comprising a fungus-impregnated culture medium and the concentrate (i. e., a product of a process of concentration by drying or evaporation) of a liquid extract of a fungus-impregnated culture medium. This product is powerful in its enzymic properties, though of small bulk. Being dry, i. e., of reduced moisture content, it will keep and preserve its enzymic properties practically indefinitely.

The novel product may be employed to great advantage in the clarification of fruit juices, as a medicinal preparation against dyspepsia and in various other fields, arts and industries.

What I claim is:

1. The process of preparing an enzymic substance which comprises lixiviating a fungus-impregnated culture medium, soaking in the liquid extract a fresh mass of fungus-impregnated culture medim, and drying the mixture.

2. The process of preparing an enzymic substance which comprises preparing two lots of fungus-impregnated culture medium, drying out one lot, lixiviating the other lot to form an aqueous extract, soaking the dried lot in the extract formed from the other lot, and drying the mixture.

3. The process of preparing an enzymic substance which comprises propagating a fungus on a culture medium, drying one lot of such medium, lixiviating another lot of such medium with a liquid to which a third lot of culture medium has been subjected, soaking the dried lot of culture medium in the extract, and reducing the moisture content of the mixture until not more than 5 per cent moisture remains.

4. As a new article of manufacture, a dry enzymic substance comprising a fungus-impregnated culture medium and the concentrate of a liquid extract of a fungus-impregnated culture medium.

5. The process of preparing an enzymic substance which comprises lixiviating a fungus-impregnated culture medium, soaking in the liquid extract a fresh mass of fungus-impregnated culture medium, drying the mixture, soaking the dried product in a fresh quantity of liquid extract of fungus-impregnated culture medium, and drying the mixture.

6. As a new article of manufacture, a dry enzymic substance comprising a fungus-impregnated culture medium and the concentrate of a liquid extract of different lots of fungus-impregnated culture medium.

7. As a new article of manufacture, a dry enzymic substance comprising a fungus-impregnated culture medium and the concentrates of liquid extracts of a fungus-impregnated culture medium.

In testimony whereof I hereto affix my signature.

SELMAN A. WAKSMAN.